(12) United States Patent
Beutner et al.

(10) Patent No.: US 12,522,561 B2
(45) Date of Patent: Jan. 13, 2026

(54) PROCESS FOR SYNTHESIZING CATIONIC LIPIDS

(71) Applicant: Bristol-Myers Squibb Company, Princeton, NJ (US)

(72) Inventors: Gregory Louis Beutner, Princeton, NJ (US); Ronald Carrasquillo-Flores, Princeton, NJ (US); Federico Lora Gonzalez, Princeton, NJ (US); Michael J. Smith, Princeton, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 488 days.

(21) Appl. No.: 18/003,232

(22) PCT Filed: Jun. 22, 2021

(86) PCT No.: PCT/US2021/038524
§ 371 (c)(1),
(2) Date: Dec. 23, 2022

(87) PCT Pub. No.: WO2021/262745
PCT Pub. Date: Dec. 30, 2021

(65) Prior Publication Data
US 2023/0265050 A1    Aug. 24, 2023

Related U.S. Application Data

(60) Provisional application No. 63/043,518, filed on Jun. 24, 2020.

(51) Int. Cl.
C07C 237/22    (2006.01)
C07C 231/02    (2006.01)

(52) U.S. Cl.
CPC .......... *C07C 237/22* (2013.01); *C07C 231/02* (2013.01)

(58) Field of Classification Search
None
See application file for complete search history.

(56) References Cited

U.S. PATENT DOCUMENTS

| 8,956,572 B2 | 2/2015 | Knopov et al. |
| 2013/0017249 A1 | 1/2013 | Niitsu et al. |
| 2013/0022665 A1 | 1/2013 | Niitsu et al. |
| 2016/0074514 A1 | 3/2016 | Payne et al. |
| 2017/0022500 A1 | 1/2017 | Minomi et al. |
| 2017/0081663 A1 | 3/2017 | Niitsu et al. |
| 2018/0208547 A1 | 7/2018 | Niitsu et al. |
| 2018/0235995 A1 | 8/2018 | Ying et al. |

FOREIGN PATENT DOCUMENTS

WO    2012170952 A2    12/2012

OTHER PUBLICATIONS

International Search Report and Written Opinion for International Application No. PCT/US2021/038524, Mailed on Sep. 27, 2021, 5 pages.
International Preliminary Report on Patentability received for PCT Application No. PCT/US2021/038524, mailed on Sep. 27, 2021, 4 pages.
Beutner, G. L. et al. (Oct. 19, 2020). "Crystallizing Fats? Development of a Scalable, Chromatography-Free Synthesis of Cationic Lipids" Org. Process Res. Dev. 2020, 24, 2709-2721.

*Primary Examiner* — Medhanit W Bahta
(74) *Attorney, Agent, or Firm* — Mintz, Levin, Cohn, Ferris, Glovsky and Popeo, P.C.

(57) ABSTRACT

The present application provides processes for synthesizing cationic lipids of Formula I useful in the synthesis of fat-soluble compositions for targeting and enhancing activity of therapeutic molecules, including siRNA.

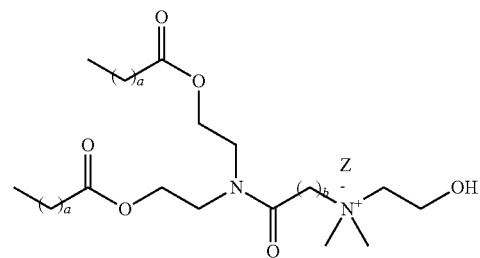

16 Claims, No Drawings

PROCESS FOR SYNTHESIZING CATIONIC LIPIDS

FIELD OF THE INVENTION

The present application provides processes for synthesizing cationic lipids useful in the synthesis of fat-soluble compositions for targeting and enhancing activity of therapeutic molecules, including siRNA.

BACKGROUND OF THE INVENTION

A number of techniques are available for delivering a therapeutic agent such as siRNA into a cell, including the use of viral transfection systems and non-viral transfection systems. Non-viral transfection systems can include, for example, polymers, lipids, liposomes, micelles, dendrimers, and nano materials. Examples of polymers that have previously been studied for cell transfection include cationic polymers such as poly(L-lysine) (PLL), polyethyleneimine (PEI), chitosan, and poly(2-dimethylamino)ethyl methacrylate (pD MAEMA). Each type of system has its respective advantages and drawbacks. For example, viral systems can yield high transfection efficiency, but may not be as safe as some non-viral systems. In addition, viral systems can be complicated and/or expensive to prepare. Non-viral transfection systems, such as cationic polymers, have been reported to transfer plasmid DNA into cells. However, some drawbacks to the use of cationic polymers include their toxicity to cells and/or their lack of stability. It has heretofore been discovered that the amino-alkyl hydroxyl (N-alkyl-OH) moiety of the compounds of formula I imparts properties to formulations not previously seen with other cationic lipids previously reported. Formulations that include compounds of formula I result in superior reduction in protein expression, as compared to formulations that do not include cationic lipids of formula I. Particularly surprising is the ability of formulations that include cationic lipids of formula I to reduce the expression of HSP47.

One such example of a cationic lipid is 2-(bis(2-(tetradecanoyloxy)ethyl)amino)-N-(2-hydroxyethyl)-N,N-dimethyl-2-oxoethan-aminium bromide (HEDC), as disclosed in U.S. Pat. No. 9,242,001. Previous synthetic strategies for producing HEDC and similar compounds were plagued with low yield, inconvenient work-up procedures, and a high number of side products.

There remains a need for a synthetic process to produce these cationic lipids that facilitates increased product yield, low by-product yield, and uses more accessible synthetic techniques.

SUMMARY OF THE INVENTION

In one aspect, the present application provides a process for producing HEDC.

In one embodiment the present application provides a process for synthesizing a compound of Formula I

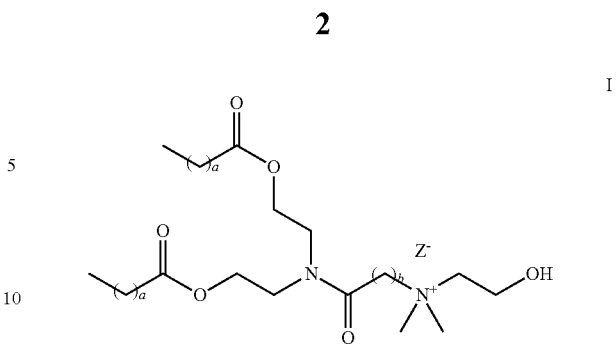

wherein, a is an integer from 8-14;
b is an integer from 1-3; and
Z is a counterion,
the process comprising,
a) reacting a compound of Formula II

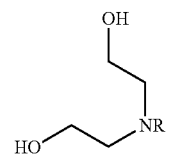

wherein, R is a protecting group;
with a compound of Formula III

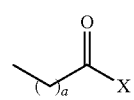

wherein, X is a halogen,
and methanesulfonic acid
to form a compound of Formula IV

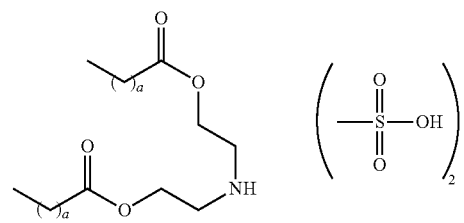

b) reacting a compound of Formula IV with a compound of Formula V

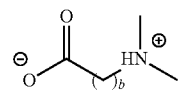

and oxalic acid to form a compound of Formula VI

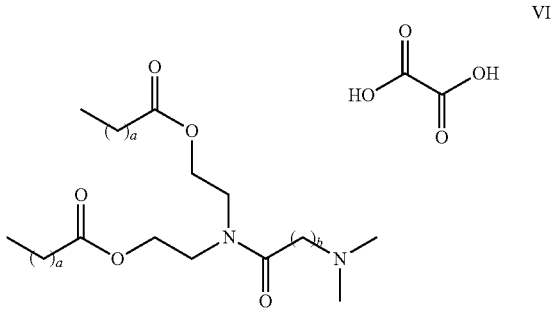

and c) reacting a compound of Formula VI with bromoethanol under coupling conditions to form a compound of Formula I.

In another further embodiment a is 12.

In yet another further embodiment b is 2.

In another embodiment R is independently selected from the group consisting of carboxybenzyl, p-methoxybenzyl carbonyl, t-butyloxycarbonyl, 9-fluorenylmethyloxycarbonyl, acetyl, trifluoroacetyl, benzoyl, benzyl, carbamate, p-methoxybenzyl, 3,4-dimethoxybenzyl, tosyl, trichloroethyl chloroformate, (4-nitrophenyl) sulfonyl, methyl, ethyl, propyl, n-butyl, t-butyl, succinimide, 2,6-dimethylphenol, 2,6-diisopropylphenol, 2,6-di-tert-butylphenol, trimethylsilyl, allyl, 1,1-dimethylallyl, 2,2,2-trifluoro ethyl, phenyl, and 4-methoxybenzyl.

In a further embodiment R is t-butyloxycarbonyl.

In a further embodiment X is from Cl or Br. In a further embodiment X is Cl.

In a further embodiment Z is Cl$^-$ or Br$^-$. In another embodiment Z is Br$^-$.

In a further embodiment the yield of a) is at least about 75%. In another embodiment the yield of step b) is at least about 75%.

In a further embodiment in step c) bromoethanol is used in between about 2 and about 4 equivalents and the compound of Formula VI is used in about 1 equivalent. In a further embodiment in step c) bromoethanol is used in about 2.2 equivalents and the compound of Formula VI is used in about 1 equivalent.

In a further embodiment the compound of Formula IV is isolated as a solid. In a further embodiment the compound of Formula VI is isolated as a crystalline solid. In a further embodiment the compound of Formula VI is isolated as a crystalline solid in a yield of 80-90%.

In a further embodiment the compound of Formula VI is isolated as a solid. In a further embodiment the compound of Formula VI is isolated as a crystalline solid. In a further embodiment the compound of Formula VI is isolated as a crystalline solid in a yield of 80-95%.

In a further embodiment the compound of Formula I is

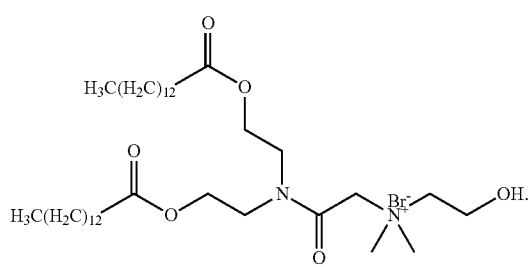

In a further embodiment the compound of Formula I is produced in at least about 60% yield from the compound of Formula II.

In a further embodiment the compound of Formula I is produced in at least about 65% yield from the compound of Formula II.

In another embodiment a compound of Formula I is prepared by the process of steps a)-c).

DETAILED DESCRIPTION OF THE INVENTION

Throughout the specification and the appended claims, a given chemical formula or name shall encompass all stereo and optical isomers and racemates thereof where such isomers exist. Unless otherwise indicated, all chiral (enantiomeric and diastereomeric) and racemic forms are within the scope of the invention. Many geometric isomers of C=C double bonds, C=N double bonds, ring systems, and the like can also be present in the compounds, and all such stable isomers are contemplated in the present invention. Cis- and trans- (or E- and Z-) geometric isomers of the compounds of the present invention are described and may be isolated as a mixture of isomers or as separated isomeric forms. The present compounds can be isolated in optically active or racemic forms. Optically active forms may be prepared by resolution of racemic forms or by synthesis from optically active starting materials. All processes used to prepare compounds of the present invention and intermediates made therein are considered to be part of the present invention. When enantiomeric or diastereomeric products are prepared, they may be separated by conventional methods, for example, by chromatography or fractional crystallization.

Depending on the process conditions the end products of the present invention are obtained either in free (neutral) or salt form. Both the free form and the salts of these end products are within the scope of the invention. If so desired, one form of a compound may be converted into another form. A free base or acid may be converted into a salt; a salt may be converted into the free compound or another salt; a mixture of isomeric compounds of the present invention may be separated into the individual isomers. Compounds of the present invention, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the invention.

The term "stereoisomer" refers to isomers of identical constitution that differ in the arrangement of their atoms in space. Enantiomers and diastereomers are examples of stereoisomers. The term "enantiomer" refers to one of a pair of molecular species that are mirror images of each other and are not superimposable. The term "diastereomer" refers to stereoisomers that are not mirror images. The term "racemate" or "racemic mixture" refers to a composition composed of equimolar quantities of two enantiomeric species, wherein the composition is devoid of optical activity. It is well understood in the art that controlling the stereochemistry of a product is possible by choosing the stereochemistry of the starting materials, and that the stereochemistry of a product can be changed by changing the stereochemistry of the starting material. It is also well understood in the art how to separate a racemic mixture such that the stereochemical purity of a product is >99%.

Abbreviations as used herein, are defined as follows: "°C." for degrees Celsius, "eq" for equivalent or equivalents, "g" for gram or grams, "mg" for milligram or milligrams, "L" for liter or liters, "mL" for milliliter or milliliters, "μL" for microliter or microliters, "N" for normal, "M" for molar, "mmol" for millimole or millimoles, "min" for minute or minutes, "h" for hour or hours, "rt" for room temperature, "RT" for retention time, "conc." for concentrate, "sat" or "saturated" for saturated, "MW" for molecular weight, "ee" for enantiomeric excess, "MS" or "Mass Spec" for mass spectrometry, "ESI" for electrospray ionization mass spectrometry, "HR" for high resolution, "HRMS" for high resolution mass spectrometry, "LCMS" for liquid chromatography mass spectrometry, "HPLC" for high pressure liquid chromatography, "NMR" for nuclear magnetic resonance spectroscopy, "1H" for proton, and "D", "L" "α", "β", "R", "S", "E", and "Z" are stereochemical designations familiar to one skilled in the art.

Provided herein is a process for the synthesis of cationic lipids. In an embodiment the process is a process for synthesizing a compound of Formula I. In an embodiment the process is a process of synthesizing a compound of Formula I starting from a compound of Formula II.

Step a)

In an embodiment step a) comprises reacting a compound of Formula II

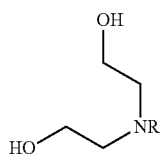

II wherein, R is a protecting group;
with a compound of Formula III

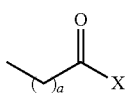

III wherein, a is an integer from 8-14; and
X is a halogen,
and methanesulfonic acid
to form a compound of Formula IV

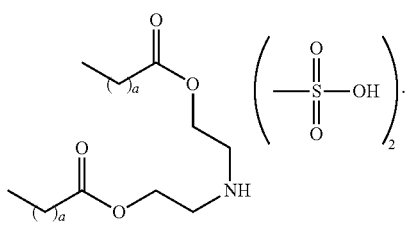

IV

In an embodiment R is an amine protecting group. In another embodiment R is selected from the group consisting of carboxybenzyl), p-methoxybenzyl carbonyl, t-butyloxycarbonyl, 9-fluorenylmethyloxycarbonyl, acetyl, trifluoroacetyl, benzoyl, benzyl, carbamate, p-methoxybenzyl, 3,4-dimethoxybenzyl, tosyl, trichloroethyl chloroformate, and (4-nitrophenyl) sulfonyl. In an embodiment R is t-butyloxycarbonyl.

In an embodiment a is an integer 8-14. In another embodiment a is an integer 8-9, 8-10, 8-11, 8-12, or 8-13. In an embodiment a is an integer 1-6. In another embodiment a is an integer 2-10, 3-10, 4-10, 5-10, 6-10, 7-10, 8-10, or 9-10. In another embodiment a is an integer 9-13 or 10-12. In an embodiment a is 8. In an embodiment a is 9. In an embodiment a is 10. In an embodiment a is 11. In an embodiment a is 12. In an embodiment a is 13. In an embodiment a is 14.

In an embodiment X is a halogen. In another embodiment X is selected from the group consisting of fluorine (F), chlorine (Cl), bromine (Br), iodine (I), astatine (At), and tennessine (Ts). In a further embodiment X is F. In a further embodiment X is Cl. In a further embodiment X is Br. In a further embodiment X is I.

In an embodiment step a) takes place in a solvent. In an embodiment step a) takes place in a mixture of solvents. In an embodiment at least one solvent is non-polar. In an embodiment the solvent(s) is selected from pentane, hexane, cyclohexane, benzene, toluene heptane, MTBE, cyclopropyl methyl ether, and diethyl ether. In an embodiment the solvent is not a di- or tri-halogenated solvent. In an embodiment step b) takes place in toluene.

In an embodiment the compound of Formula IV is isolated as a crystalline solid. In an embodiment step a) does not require chromatography for isolation or purification.

In an embodiment the compound of Formula IV is isolated as a crystalline solid. In an embodiment step a) does not require chromatography for isolation or purification. In an embodiment the purity of the produced compound of Formula IV is between about 95% and 99.9% by liquid chromatography area percent (LCAP) with no chromatography purification. In an embodiment the purity of the produced compound of Formula IV is at least about 95% by LCAP with no chromatography purification.

In an embodiment the crystalline compound of Formula IV is produced in between about 70% and 95% yield from step a). In an embodiment the compound of Formula IV is produced, in between about 70% and 85%, or in between about 70% and 75% yield. In another embodiment the compound of Formula IV is produced in between about 80% and about 95%, or in between about 90% and 95% yield. In another embodiment the compound of Formula IV is produced in about 70%, about 75%, about 80%, about 85%, about 90%, or about 95% yield. In a further embodiment the compound of Formula IV is produced in about 80% yield. In an embodiment the compound of Formula IV is produced in at least about 65% yield, in at least 70% yield, in at least 75% yield, in at least about 80% yield, or at least about 85% yield from step a). In another embodiment Formula IV is produced in at least about 80% yield from step a).

In an embodiment step a) is a telescoped two-step process. The first reaction is a N-methyl-morpholine-catalyzed double myristoylation of a compound of Formula I. Upon reaction completion, the mixture is washed with 1N aqueous acetic acid to remove unreacted starting material and salts, followed by a drying distillation. The second reaction is a N-Boc-deprotection reaction and subsequent salt formation with methanesulfonic acid (MSA).

Step b

In an embodiment step b comprises reacting a compound of Formula IV with a compound of Formula V

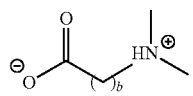

V wherein, b is an integer 1-3;
and oxalic acid to form a compound of Formula VI

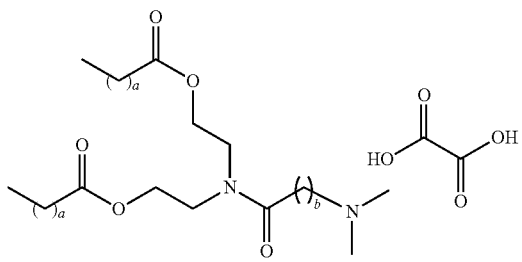

VI wherein, a is an integer 8-14; and
b is an integer 1-3.

In an embodiment a and b are as described for step a). In an embodiment a is 12 and b is 2.

In an embodiment step b) takes place in a solvent. In an embodiment at least one solvent is polar aprotic. In an embodiment the solvent(s) is selected from ethyl acetate (EtOAc), tetrahydrofuran, acetone, N,N-dimethylformamide, acetonitrile, methyTHF, NMP, DMA and dimethyl sulfoxide. In an embodiment step b) takes place in EtOAc.

In an embodiment reacting a compound of Formula IV with a compound of Formula V further comprises reacting a base. In an embodiment the base is selected from trimethylamine, sodium hydroxide, DIPEA, NMM, and potassium hydroxide. In an embodiment the base is a tertiary amine. In an embodiment the base is trimethylamine.

In an embodiment step b) takes place between about 40° C. and about 60° C. In an embodiment the process takes places between about 45° C. and about 60° C., or between about 50° C. and about 60° C. In an embodiment step b) takes place between about 40° C. and about 55° C., between about 40° C. and about 50° C., or between about 40° C. and about 45° C. In an embodiment step b) takes place between about 45° C. and about 55° C. In an embodiment step b) takes place at about 40° C., about 45° C., about 50° C., about 55° C., or about 60° C. In an embodiment step b) takes place at less than about 60° C. In an embodiment step b) takes place at about 50° C.

In an embodiment the compound of Formula VI is isolated as a crystalline solid. In an embodiment step a) does not require chromatography for isolation or purification. In an embodiment the purity of the produced compound of Formula VI is between about 95% and 99% by liquid chromatography area percent (LCAP) with no chromatography purification. In an embodiment the purity of the produced compound of Formula VI is at least about 95% by LCAP with no chromatography purification.

In an embodiment the crystalline compound of Formula VI is produced in between about 70% and 99% yield from step b). In an embodiment the compound of Formula VI is produced in between about 70% and 95%, in between about 70% and 90%, in between about 70% and 85%, in between about 70% and 80%, or in between about 70% and 75% yield. In another embodiment the compound of Formula VI is produced in between about 75% and about 99%, in between about 80% and about 99%, in between about 85% and about 99%, in between about 90% and about 99% yield, or in between about 95% and about 99% yield from step b). In another embodiment the compound of Formula VI is produced in about 70%, about 75%, about 80%, about 85%, about 90%, about 95%, or about 99% yield from step b). In a further embodiment the compound of Formula VI is produced in about 85% yield. In a further embodiment the compound of Formula VI is produced in about 90% yield.

In an embodiment the compound of Formula VI is produced in at least about 65% yield, in at least about 70% yield, in at least about 75% yield, in at least about 80% yield, or at least about 85% yield from step b). In another embodiment Formula VI is produced in at least about 80% yield from step b).

In an embodiment step b) is an amide coupling of the carboxylic acid of N,N-dimethylglycine with the amine of a compound of Formula V, to provide a compound of Formula VI.

Step c c) reacting a compound of Formula VI under coupling conditions to form a compound of Formula I

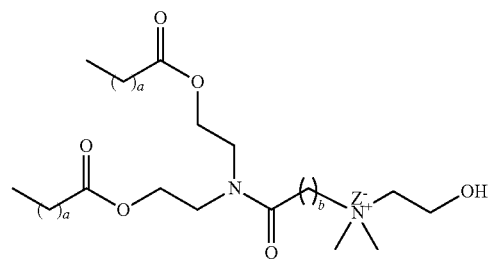

I wherein a is an integer 8-14;
b is an integer 1-3; and
Z is a counterion.

In an embodiment a and b are as described in step a). In an embodiment a is 12 and b is 2.

In an embodiment Z is Cl⁻ or Br⁻. In another embodiment Z is Br⁻.

In an embodiment step c) takes place in a solvent. In an embodiment the solvent is a combination of solvents. In another embodiment at least one solvent is polar aprotic. In another embodiment all solvents are polar aprotic. In another embodiment the solvent(s) is selected from the group consisting of EtOAc, N-methylpyrollidone, tetrahydrofuran, methylTHF, dimethylacetamide, acetone, dimethylformamide, and acetonitrile. In an embodiment step c) takes place in ethyl acetate and acetonitrile.

In an embodiment the coupling conditions comprise reacting with a base. In an embodiment the base is selected from sodium hydroxide, potassium hydroxide, DIPEA, NMM and potassium carbonate. In an embodiment the base is potassium carbonate.

It was discovered that residual water creates side reactions impacting purity and yield. Thus, in an embodiment step c) is performed in a reaction vessel with an inert environment.

In an embodiment step c) takes place between about 60° C. and about 80° C. In an embodiment the process takes places between about 65° C. and about 80° C., or between about 70° C. and about 80° C. In an embodiment step c) takes place between about 60° C. and about 75° C., or between about 60° C. and about 70° C. In an embodiment step c) takes place between about 65° C. and about 75° C. In an embodiment step c) takes place at about 60° C., about 65° C., about 70° C., about 75° C., or about 80° C. In an embodiment step c) takes place at about 70° C.

In an embodiment the compound of Formula I is produced in between about 70% and 99% yield from step c). In an embodiment the compound of Formula I is produced in between about 70% and 95%, in between about 70% and 90%, in between about 70% and 85%, in between about 70% and 80%, or in between about 70% and 75% yield. In another embodiment the compound of Formula I is produced in between about 75% and about 99%, in between about 80% and about 99%, in between about 85% and about 99%, in between about 90% and about 99% yield, or in between about 95% and about 99% yield from step c). In another embodiment the compound of Formula I is produced in about 70%, about 75%, about 80%, about 85%, about 90%, about 95%, or about 99% yield from step c). In a further embodiment the compound of Formula I is produced in about 90% yield. In a further embodiment the compound of Formula I is produced in about 95% yield.

In an embodiment the compound of Formula I is produced in at least about 65% yield, in at least about 70% yield, in at least about 75% yield, in at least about 80% yield, at least about 85% yield from step c), at least about 90% yield from step c), or at least about 95% yield from step c). In another embodiment Formula I is produced in at least about 90% yield from step c).

In an embodiment the compound of Formula I is isolated as a crystalline solid. In an embodiment step a) does not require chromatography for isolation or purification. In an embodiment the purity of the produced compound of Formula I is between about 95% and 99.9% by LCAP with no chromatography purification. In an embodiment the purity of the produced compound of Formula VI is at least about 95% by LCAP with no chromatography purification.

In an embodiment step c) is a coupling reaction. In an embodiment step c) is a quaternization of the tertiary amine of a compound of Formula VI with bromoethanol affording a bromide salt of Formula I.

Overall Process

In an embodiment the compound of Formula I is produced in between about 40% and about 80% overall yield from the compound of Formula II. In an embodiment the compound of Formula I is produced in between about 40% and about 70% yield, about 40% and about 60% yield, about 40% and about 50% yield, or about 40% and about 45% yield from the compound of Formula II. In an embodiment the compound of Formula I is produced in between about 50% and about 80%, about 60% and about 80% yield, about 70% and about 80% yield, or about 75% and about 80% yield from the compound of Formula II. In an embodiment the compound of Formula I is produced in about 60% yield from the compound of Formula II. In an embodiment the compound of Formula I is produced in about 65% yield from the compound of Formula II. In an embodiment the compound of Formula I is produced in at least about 40% yield, at least about 50% yield, at least about 60% yield, or at least about 65% yield from the compound of Formula II. In an embodiment the compound of Formula I is produced in at least about 50% yield from the compound of Formula II. In an embodiment the compound of Formula I is produced in at least about 60% yield from the compound of Formula II.

EXAMPLES

Example 1. Synthesis of azanediylbis(ethane-2,1-diyl) ditetradecanoate methanesulfonic acid salt methanesulfonic acid solvate

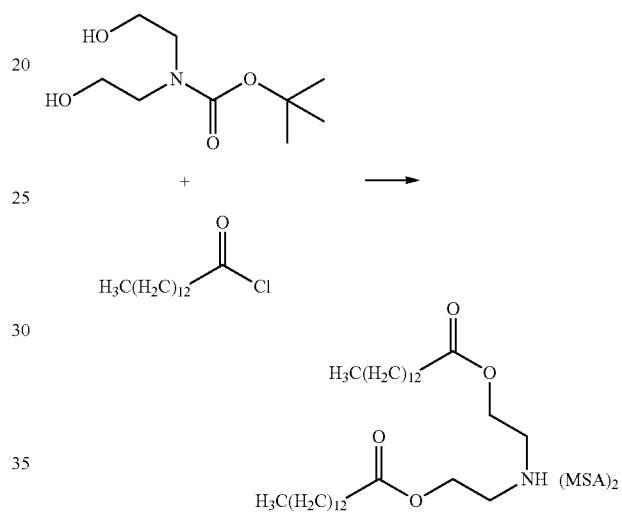

Toluene (26.1 kg, 30.0L, 30 L/kg) was charged to Reactor 1 followed by N-Boc-diethanolamine (1.00 kg, 0.920 L). Observation: The presence of water can lead to the myristoylation reaction stalling and higher levels of an impurity (myristic acid). Reactor should be rinsed and dried thoroughly prior to use. The jacket temperature was set to 15-25° C. (target 20° C.). N-methyl-morpholine (1.68 kg, 1.82 L, 3.4 equiv) was charged. Myristoyl chloride (2.65 kg, 2.94 L, 2.2 equiv) was charged to the reactor over no less than 30 minutes, maintaining a batch temperature <30° C. (target 20° C.). The reaction was aged at 15-25° C. (target 20° C.) for no less than 5 hours.

Acetic acid 1N in half brine (11.0 kg, 10 L, 10 L/kg) was charged to the reactor. The reaction was heated to 25-35° C. (target 30° C.) under agitation and aged for 30 minutes. Agitation was stopped and the reaction was allowed to settle the phases for at least 30 minutes. The phases were split, sending the aqueous bottom phase to waste. This wash was repeated.

The organic layer was distilled under vacuum (P<100 mbar) to a final volume of 14 L/kg maintaining a jacket setpoint temperature 45° C. Observation: The distillation is typically performed as a put and take, a minimum volume of 20 L/kg of toluene added is recommended to dry the stream. The presence of water in the subsequent steps can lead to the decomposition of the product. These impurities significantly increase the solubility of the product, which in turn significantly decreases yield. Additionally, changes in the solubility affect the seed point in step 28.

The reaction mixture was transferred to Reactor 2 through a polish filter, to remove precipitated NaCl. Toluene was charged as a vessel rinse of Reactor 1 using a sprayball and transferred through the polish filter line to Reactor 2 (3.48 kg, 4.0 L, 4.0 L/kg). The reaction was heated to 30-40° C. (target 35° C.) under agitation and nitrogen atmosphere. Methanesulfonic acid (0.936 kg, 0.693 L, 2.0 equiv.) was charged over no less than 30 minutes, maintaining a batch temperature 30-40° C. (target 35° C.). Note: Use anhydrous methanesulfonic acid (KF<0.75 wt %). Excess water can cause decomposition of BMT-334112. Anhydrous ethyl acetate (2.70 kg, 3.0 L, 3.0 L/kg) was charged to the reaction and the reaction was aged at 30-40° C. (target 35° C.) for no less than 1 hour then cooled to to 27-31° C. (target 29° C.).

Azanediylbis(ethane-2,1-diyl) ditetradecanoate methanesulfonic acid salt methanesulfonic acid solvate seeds (0.050 kg, 5 wt %) were charged to the reaction. The reaction was then cooled to 10-20° C. (target 15° C.) over no less than five hours.

The following cool down ramp was implemented:
i. 29° C. to 27.25° C. over 30% of the total cool down time
ii. 27.25° C. to 24.5° C. over 30% of the total cool down time
iii. 24.5° C. to 15° C. over 40% of the total cool down time
Observation: A non-linear cool down is implemented to aid in filtration rate and impurity purge, due to the impact of temperature on the solubility of the product in toluene/ethyl acetate.

The reaction batch was then cooled at 10-20° C. (target 15° C.) for 1 hour and filtered. Tertiary-butyl methyl ether (MTBE, 2.22 kg, 3.0 L, 3.0 L/kg) was charged to reactor 1 as a crystallizer flush and cooled to 10-20° C. (target 15° C.). The product cake was then rinsed with the MTBE wash from reactor 1, filtering the wash. The cake was dried under vacuum and nitrogen sweep, at a jacket setpoint of 20-30° C. (target 25° C.) to yield crystalline azanediylbis(ethane-2,1-diyl) ditetradecanoate methanesulfonic acid salt methanesulfonic acid solvate in 90% yield. Observation: Elevated temperatures can cause the wet cake to melt/dissolve and lead to significant degradation of the product.

Example 2: Synthesis of ((dimethylglycyl)azanediyl)bis(ethane-2,1-diyl) ditetradecanoate oxalate salt

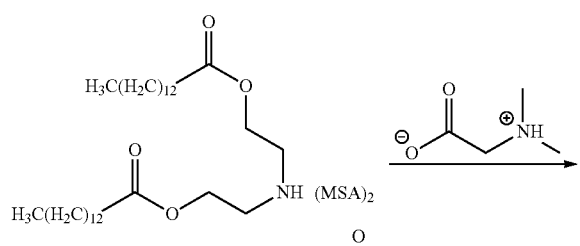

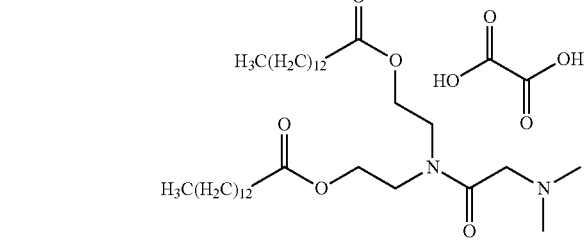

EtOAc was charged to Reactor 3. Dry EtOAc should be used (KF<200 ppm) to minimize the decomposition of pivaloyl choride (PivCl) reagent. N, N-dimethylglycine (0.20 kg, 1.4 equiv) was charged to Reactor 3 to create a slurry. The presence of water can lead to incomplete reaction. The reactor should be thoroughly rinsed with EtOAc prior to use. Triethylamine (TEA) (0.62 kg, 4.4 equiv) was charged to Reactor 3 followed by PivCl (0.32 kg, 1.9 equiv). The reaction ran for at least 3 h at 50° C. followed by cooling to 20° C. Azanediylbis(ethane-2,1-diyl) ditetradecanoate (1 kg, 1 equiv) was charged to Reactor 3 followed by EtOAc (6 L, 6 L/kg). The reaction ran for 1.5 h at 20° C.

Water (8.32 L, 8.32 L/kg) was charged to Reactor 3. The water will remove organic salts formed as reaction by-products. Sodium chloride brine 25% (1.68 L, 1.68 L/kg) was charged to Reactor 3 and aged for at least 0.5 h at 20° C. Agitation was stopped and the reaction was allowed to settle for at least 0.5 h at 20° C. The phases were separated, sending the lower aqueous layer from Reactor 3 to waste. Carbonate buffer pH (10 L, 10 L/kg) was charged to Reactor 3 and allowed to age for at least 1 h at 20° C. Agitation was stopped and reaction was allowed to settle for at least 1 h at 20° C. The phases were separated, sending the lower aqueous layer from Reactor 3 to waste.

EtOAc (5 L, 5.0 L/kg) was then charged to Reactor 3 and cooled to 5° C. and the batch was distilled to a concentration of 10 L/kg. Distillation should be performed at a pressure of 50 mbar with a jacket temperature setpoint between 25-35° C. Temperatures higher than 35° C. can result in impurity generation over prolonged holds.

Toluene (10 L, 10.0 L/kg) was charged to Reactor 3 and the reaction was heated to 52° C. Oxalic acid solution (5 L, 5.0 L/kg, 1.1 equiv) was charged above surface to Reactor 3 over no less than 1 h and aged for 1 h. The batch was then cooled per the following schedule:

a. Cool the batch to 46° C. over 3.5 h and age for 2 h.
b. Cool the batch to 40° C. over 2.5 h.
c. Cool the batch to 20° C. over 2 h and age for at least 1 h.

The resultant slurry was filtered and EtOAc (2 L, 2.0 L/kg) was charged to Reactor 3. This EtOAc (2.0 L/kg) was used to wash the cake. The caked is then dried at a jacket setpoint temperature of ≤55° C. (Target is 50-55° C.) under vacuum to yield ((dimethylglycyl)azanediyl)bis(ethane-2,1-diyl) ditetradecanoate oxalate salt in 94% yield.

Example 3: Synthesis of $N^1,N^{19}$-bis((S)-16,20-diamino-15-oxo-4,7,10-trioxa-14-azaicosyl)-4,7,10,13,16-pentaoxanonadecanediamide (HEDC)

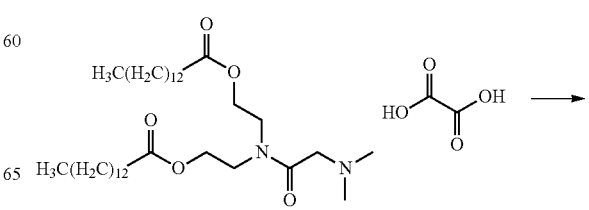

-continued

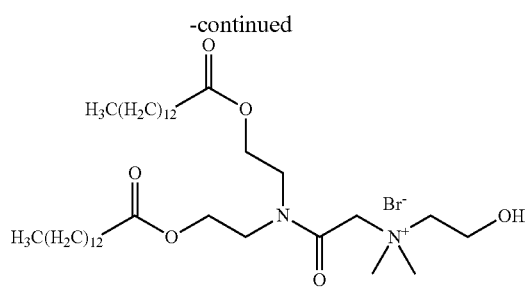

EtOAc (20 L) was charged to Reactor 1 followed by ((dimethylglycyl)azanediyl)bis(ethane-2,1-diyl) ditetradecanoate oxalate salt (1 kg). Carbonate buffer solution pH 9.5 carbonate buffer solution (15 L) was charged to Reactor 1 and the reaction was heated to 30° C., then aged for at least 1 h. The reaction was cooled to 20° C., then agitation was stopped and the reaction was allowed to settle for at least 1 h at 20° C. The phases were separated, sending the lower aqueous layer from Reactor 1 to waste. Water was charged (9.16 L) to Reactor 1 followed by sodium chloride brine 25% (0.84 L). The reaction was aged for at least 0.5 h at 20° C. under agitation. Agitation was stopped and the reaction was allow to settle for at least 0.5 h at 20° C. The phases were then separated, sending the lower aqueous layer from Reactor 1 to waste.

The reaction from Reactor 1 was then Polish filtered into Reactor 2. Reactor 1 was then rinsed with EtOAc (5 L) which was transfer through polish filter to Reactor 2. The Reactor 2 solution was then cooled to 5° C. followed by distillation concentration at a pressure of 50 mbar with a jacket temperature setpoint between 25-35° C. to 5±0.5 L/kg. 2-bromoethanol (0.40 kg) was charged to Reactor 2. Followed by MeCN (6 L). The Reactor 2 solution was then cooled to 5° C. followed by distillation concentration at a pressure of 50 mbar with a jacket temperature setpoint between 25-35° C. to 5±0.5 L/kg. Reactor 2 was then heated to 70° C. and aged for at least 24 h, then cooled to 60° C.

EtOAc was charged to Reactor 2 (15 L) and it was cooled to 45° C. HEDC seeds were added (0.005 kg) to Reactor 2 and aged for at least 1 h at 45° C. Reactor 2 was then cooled according to the following schedule:
  a. Cool to 40° C. over 3 h.
  b. Cool to 35° C. over 1.5 h.
  c. Cool to 30° C. over 1 h.
  d. Cool to 20° C. over 1 h.
  e. Age for at least 1 h at 20° C.

The resultant slurry was then filtered. EtOAc was used to rinse Reactor 3. This EtOAc was then used to rinse the cake. The cake was then thoroughly washed with EtOAc at least twice (4 L each). The final product cake was dried at a jacket setpoint temperature of ≤55° C. (Target is 50-55° C.) under vacuum to yield HEDC in 92% yield.

What is claimed is:

1. A process for synthesizing a compound of Formula I

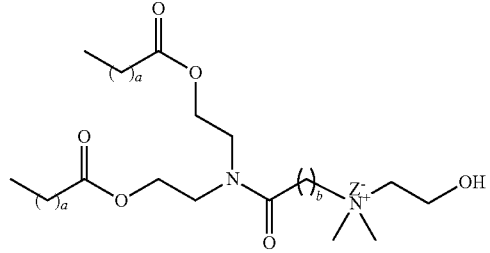

wherein a is an integer from 8-14;
b is an integer from 1-3; and
Z is Br;
the process comprising,
  a) reacting a compound of Formula II

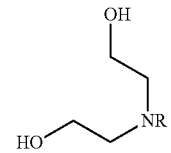

wherein R is a protecting group;
with a compound of Formula III

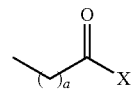

wherein X is a halogen;
and methanesulfonic acid
to form a compound of Formula IV

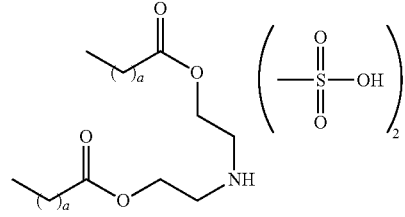

b) reacting a compound of Formula IV with a compound of Formula V

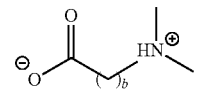

and oxalic acid to form a compound of Formula VI

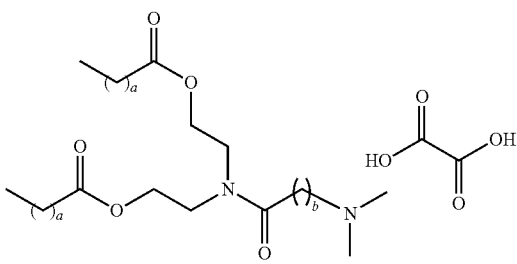

and c) reacting a compound of Formula VI with bromoethanol under coupling conditions to form a compound of Formula I.

2. The process of claim 1 wherein a is 12.

3. The process of claim 1 wherein b is 2.

4. The process of claim 1 wherein R is selected from the group consisting of carboxybenzyl, p-methoxybenzyl carbonyl, t-butyloxycarbonyl, 9-fluorenylmethyloxycarbonyl, acetyl, trifluoroacetyl, benzoyl, benzyl, carbamate, p-methoxybenzyl, 3,4-dimethoxybenzyl, tosyl, trichloroethyl chloroformate, (4-nitrophenyl) sulfonyl, methyl, ethyl, propyl, n-butyl, t-butyl, succinimide, 2,6-dimethylphenol, 2,6-diisopropylphenol, 2,6-di-tert-butylphenol, trimethylsilyl, allyl, 1,1-dimethylallyl, 2,2,2-trifluoroethyl, phenyl, and 4-methoxybenzyl.

5. The process of claim 4 wherein R is t-butyloxycarbonyl.

6. The process of claim 1 wherein X is Cl or Br.

7. The process of claim 6 wherein X is Cl.

8. The process of claim 1 wherein the yield of step a) is at least about 80%.

9. The process of claim 1 wherein the yield of step b) is at least about 80%.

10. The process of claim 1 wherein in step c) bromoethanol is used in between about 2 and about 4 equivalents and the compound of Formula VI is used in about 1 equivalent.

11. The process of claim 10 wherein in step c) bromoethanol is used in about 2.2 equivalents.

12. The process of claim 1 wherein the compound of Formula IV is isolated as a solid.

13. The process of claim 12 wherein the compound of Formula IV is isolated as a crystalline solid.

14. The process of claim 1 wherein the compound of Formula VI is isolated as a crystalline solid.

15. The process of claim 1 wherein the compound of Formula I is

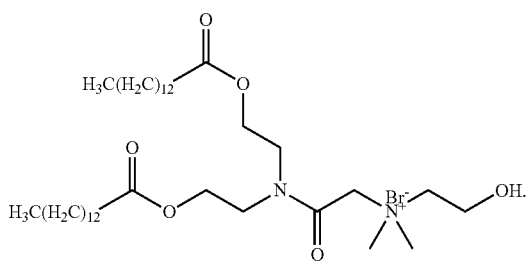

16. The process of claim 1 wherein the compound of Formula I is produced in at least about 60% yield from the compound of Formula II.

* * * * *